US005752080A

United States Patent [19]

Ryan

[11] Patent Number: 5,752,080
[45] Date of Patent: May 12, 1998

[54] CABLE TERMINAL UNIT USING BIT SET FOR SELECTIVELY ENABLING A PLURALITY OF HARDWARE FUNCTIONS WITH SOME FUNCTIONS HAVING A PLURALITY OF SELECTIVELY ENABLED HARDWARE FUNCTIONS

[75] Inventor: Lawrence D. Ryan, Princeton Junction, N.J.

[73] Assignee: Intel Corporation, Santa Clara, Calif.

[21] Appl. No.: 361,780

[22] Filed: Dec. 22, 1994

[51] Int. Cl.$^6$ ............................................. G06F 13/362
[52] U.S. Cl. ............................................. 395/828; 395/832
[58] Field of Search ........................... 455/4, 17; 364/900; 395/275, 828, 832, 775; 348/1, 6

[56] References Cited

U.S. PATENT DOCUMENTS

| | | | |
|---|---|---|---|
| 4,367,557 | 1/1983 | Stern et al. | 455/4 |
| 4,468,731 | 8/1984 | Johnson et al. | 395/183.18 |
| 4,682,367 | 7/1987 | Childress et al. | 455/17 |
| 4,802,119 | 1/1989 | Heene et al. | 364/900 |
| 4,901,274 | 2/1990 | Maejima et al. | 364/900 |
| 5,220,673 | 6/1993 | Dalrymple et al. | 395/775 |
| 5,257,352 | 10/1993 | Blanck et al. | 395/275 |
| 5,289,271 | 2/1994 | Watson | 348/1 |
| 5,297,272 | 3/1994 | Lu et al. | 395/500 |
| 5,321,827 | 6/1994 | Lu et al. | 395/500 |
| 5,359,419 | 10/1994 | Kawasaki | 348/6 |
| 5,359,608 | 10/1994 | Belz et al. | 395/183.14 |
| 5,361,358 | 11/1994 | Cox et al. | 395/712 |
| 5,365,587 | 11/1994 | Campbell et al. | 380/25 |
| 5,410,726 | 4/1995 | Bagai et al. | 395/653 |
| 5,450,576 | 9/1995 | Kennedy | 395/652 |
| 5,657,448 | 8/1997 | Wadsworth et al. | 395/200.5 |

OTHER PUBLICATIONS

Zimmermann, Philip, Pretty Good Privacy (PGP) Public Key Encryption for the Masses, User's Guide Essential Topics, vol. I, Aug. 31, 1994.

Zimmermann, Philip, Pretty Good Privacy (PGP) Public Key Encryption for the Masses, User's Guide Special Topics, vol. II, Aug. 31, 1994.

*Primary Examiner*—Thomas C. Lee
*Assistant Examiner*—David Ton
*Attorney, Agent, or Firm*—William H. Murray; N. Stephan Kinsella

[57] ABSTRACT

A terminal unit for use within a digital cable system having a head end control unit and a cable and related method for upgrading hardware functions. According to a preferred embodiment, the terminal unit is provided and comprises a processor and an optional hardware function, wherein the hardware function is enabled or disabled. The terminal unit further comprises a memory for storing a bit set representative of the enabled or disabled status of the optional hardware function. The bit set is set to enable or disable the optional hardware function in accordance with a control signal received by the terminal unit from the head end control unit. The terminal unit also enables or disables the optional hardware function in accordance with the bit set. The terminal unit and the head end control unit are connected to the cable, and the control signal is broadcasted with the head end control unit via the cable to the terminal unit.

27 Claims, 2 Drawing Sheets

CABLE TERMINAL UNIT USING BIT SET FOR SELECTIVELY ENABLING A PLURALITY OF HARDWARE FUNCTIONS WITH SOME FUNCTIONS HAVING A PLURALITY OF SELECTIVELY ENABLED HARDWARE FUNCTIONS

BACKGROUND OF THE INVENTION

1. Field of the Invention

The present invention relates to digital cable systems having terminal units and, in particular, to methods and systems for enabling terminal unit hardware functions.

2. Description of the Related Art

In analog cable systems in current use, a terminal unit is often supplied to customers or users of the cable system. The terminal units may be, for example, cable TV converter boxes attached to a user's television and to the cable system. Also attached to the cable system for control of the terminal units is a head end control unit under the control of the cable system operator. In this configuration each terminal unit is uniquely addressable by the head end control unit, so that the head end control unit may broadcast a control signal to be received by a selected terminal unit(s).

Several channels of analog TV signals are typically transmitted through the cable system to the terminal units, where each channel comprises a certain carrier frequency having a frequency bandwidth. In current usage, users may choose and pay for various tiers of programming services deliverable across the cable system. For example, a user may choose a "basic" package of services which allows him or her to receive and thus view a basic set of TV channels. Higher tiers of services may include, for example, the basic set of channels plus certain premium movie channels. Pay-per-view services allow individual movies or other programs to be viewed at predetermined times on dedicated pay-per-view channels.

To implement these tiers of services, terminal units are configured to deliver to the attached television some of the TV channel signals present on the cable system, and to block other signals that are not included in the user's selected tier of services so that they may not be accessed by the user. Each terminal unit may typically have a non-volatile memory containing a bit set representing which TV channel signals the terminal unit should pass on to the attached television, and which TV channel signals the terminal unit should block to prevent the attached television from receiving. Some TV channel signals may be broadcast over the cable system in encoded or scrambled form, which a terminal unit may decode or descramble to deliver a usable TV channel signal to the attached television if the bit set indicates that this channel is included in the user's tier of services. Blocking a TV channel signal may consist of scrambling a signal, outputing an unusable signal for that channel, or simply not descrambling a scrambled signal.

Thus, where a user has selected only the basic tier of services, his terminal unit will contain a bit set that instructs the terminal unit to block all non-basic TV channel signals. Sometimes users decide to upgrade to a higher level of services, and may telephone the cable system operator and place an order for the upgraded service. In this case the head end control unit, under the control of the cable system operator, will transmit a new bit set over the cable system to the corresponding terminal unit. With the new bit set stored in the terminal unit, the terminal unit will stop blocking the newly-purchased TV channels and will transmit them to the user's television. For pay-per-view services, a new bit set may be transmitted to a user's terminal unit to enable a given pay-per-view channel only during the time a certain program is to be broadcast over the TV channel. The bit set may contain a built-in time period for which the additional program channel is to be activated, or, alternatively, a new bit set may be transmitted by the head end control unit after the pay-per-view program is completed to once again disable that channel.

In emerging digital cable systems, a wider range of services are offered over many digital signal channels. In addition to broadcast programs for viewing by a user, some channels may include interactive services such as programming guides, shopping channels, banking services, email, software applications downloading services, and video games. Each terminal unit in a digital cable system may be a sophisticated processor-based system attached to a monitor or television, or may be, for example, an adapter board for a personal computer ("PC") system. Each terminal unit may be directed, under control of a head end control unit, to allow or block certain digital channel services based on the tier of services selected by the user.

More sophisticated uses, such as graphics-heavy or processing-heavy video games, can require extra hardware processing functions within the terminal unit. For example, certain video games may require a math co-processor, extra RAM, or a 3D graphics accelerator. Alternatively, some video games may function without such hardware processing functions or components, but the performance of the video game may be enhanced if such hardware processing functions are available.

If such extra hardware functions are not physically included within a terminal unit, it will be inconvenient, too costly, or otherwise not worthwhile to some users to acquire and physically install an additional or replacement hardware module or component, or an upgraded terminal unit having the extra hardware components. Such upgrades may require the user bringing the terminal unit in to a local service center or paying a service technician to perform a field upgrade. Time and cost will be incurred in selecting any such upgrades, resulting in many impulse purchases being dissuaded. If, however, a terminal unit initially contains the extra hardware components and functions, some users who initially desire only basic services and hardware components may face higher initial costs than they would if their terminal unit did not contain the additional hardware functions. There is thus a need to provide additional hardware functions on demand to users of digital cable system terminal units, but without requiring an initial selection and purchase of these additional hardware functions by users.

It is accordingly an object of this invention to overcome the disadvantages and drawbacks of the known art and to provide a digital cable system terminal unit and system with upgradable hardware-functions and method that is more efficient than prior methods for upgrading hardware functions of such terminal units.

Further objects and advantages of this invention will become apparent from the detailed description of a preferred embodiment which follows.

SUMMARY

The previously mentioned objectives are fulfilled with the present invention. There is provided herein a terminal unit for use within a digital cable system having a head end control unit and a cable, and a related method for upgrading hardware functions. According to a preferred embodiment of the invention, the terminal unit is provided and comprises a processor means and an optional hardware function, wherein the hardware function is enabled or disabled. The terminal unit further comprises a memory means for storing a bit set representative of the enabled or disabled status of the optional hardware function. The bit set is set to enable or disable the optional hardware function in accordance with a control signal received by the terminal unit from the head end control unit. The terminal unit also enables or disables the optional hardware function in accordance with the bit set. The terminal unit and the head end control unit are connected to the cable, and the control signal is broadcasted with the head end control unit via the cable to the terminal unit.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

Figure 1:
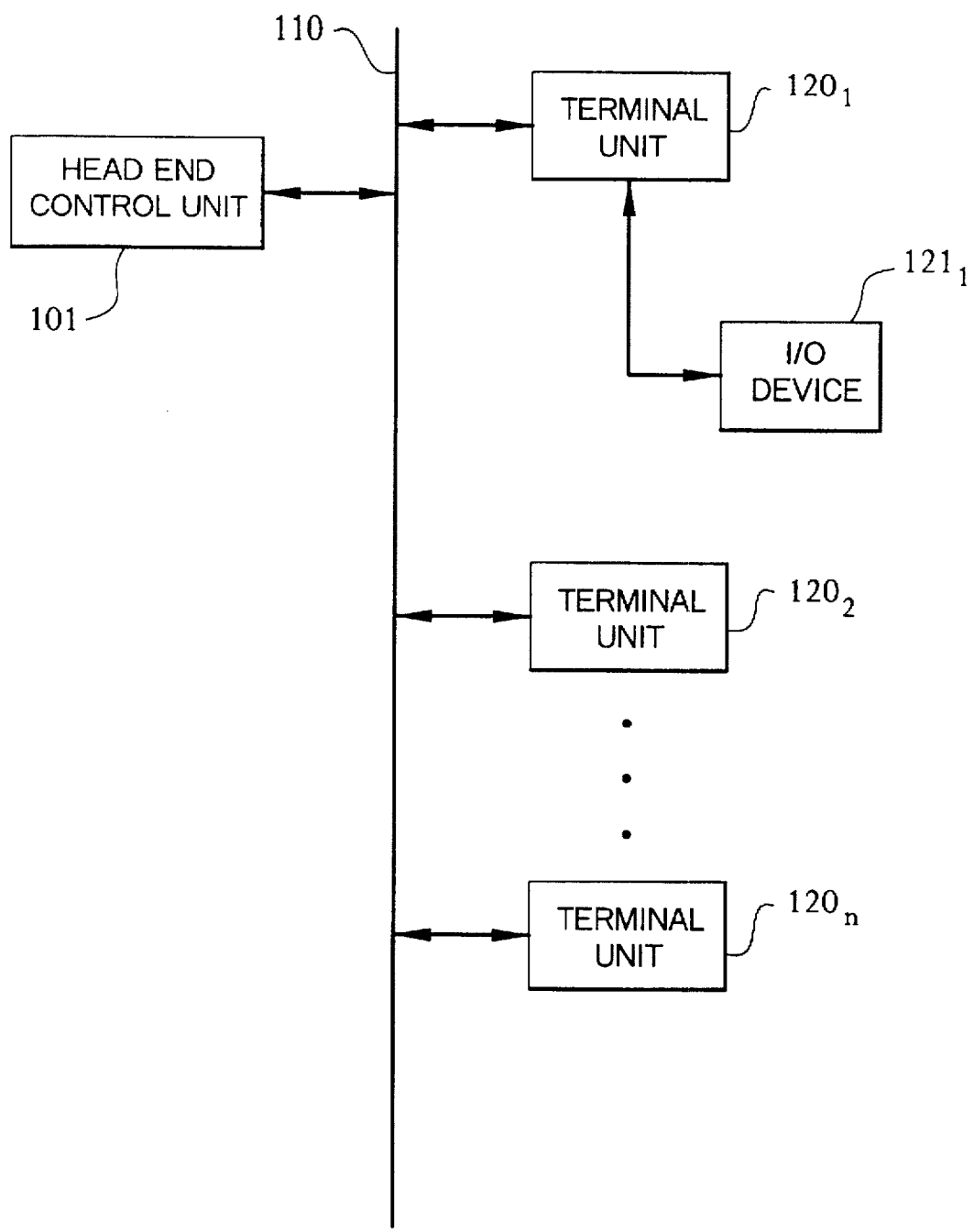
FIG. 1 is a digital cable system, according to a preferred embodiment of the present invention.

Referring now to FIG. 1, there is shown a digital cable system 100, according to a preferred embodiment of the present invention. Digital cable system 100 contains a head end control unit 101, which is attached to a cable 110. A plurality of N terminal units $120_1-120_N$ are also connected to cable 110. Cable 110 is any cable suitable for transmitting digital signals, such as coax or an optical fiber based cable. Head end control unit 101 is a processor based unit suitable for processing, transmitting, and receiving digital signals for communication with and control of terminal units $120_1-120_N$.

Each terminal unit $120_i$ is uniquely addressable by head end control unit 101. With this configuration, head end control unit 101 may broadcast control signals to be received by a selected terminal unit or units of terminal units $120_1-120_N$.

Head end control unit 101 may send control signals to one or more terminal units $120_1-120_N$ in several ways, including:

A dedicated control channel that is either continuously tuned to by the terminal units or selectively tuned to upon command of the terminal processor 202;

A control channel embedded in one or more video signals, typically using one or more TV lines in the TV signal vertical blanking interval; and A control channel embedded in one or more digital data channels, wherein specific header bits identify one or more packets of data as being control data.

As illustrated with respect to $120_1$, each terminal unit such as terminal unit $120_1$ is attached to an input/output ("I/O") device such as I/O device 121. I/O device 121 may contain both input and output devices (not shown) suitable for use with terminal unit $120_1$. For example, I/O device 121 may contain output devices such as a PC monitor (where terminal unit $120_1$ is, for example, an adapter board of a PC) and audio speakers, or simply a television that can display video signals transmitted by terminal unit $120_1$. Where terminal unit $120_1$ is an adapter board of a PC, input devices may be the keyboard of the PC or further signals transmitted by the PC to terminal unit $120_1$, such as signals from a joystick or mouse attached to the PC for use with video games. Alternatively, I/O device 121 may contain an input device such as a keypad or remote control that directly allows input into terminal unit $120_1$.

It will be understood that such input devices may be used by a user to transmit information to terminal unit $120_1$ or to a remote processor such as head end control unit 101 connected to cable 110. As an example, a user may choose with terminal unit $120_1$ a video game channel that allows interactive video games to be played using a monitor (not shown) of I/O device 121 and an input device such as a joystick or keypad (not shown) connected to I/O device 121.

Figure 2:
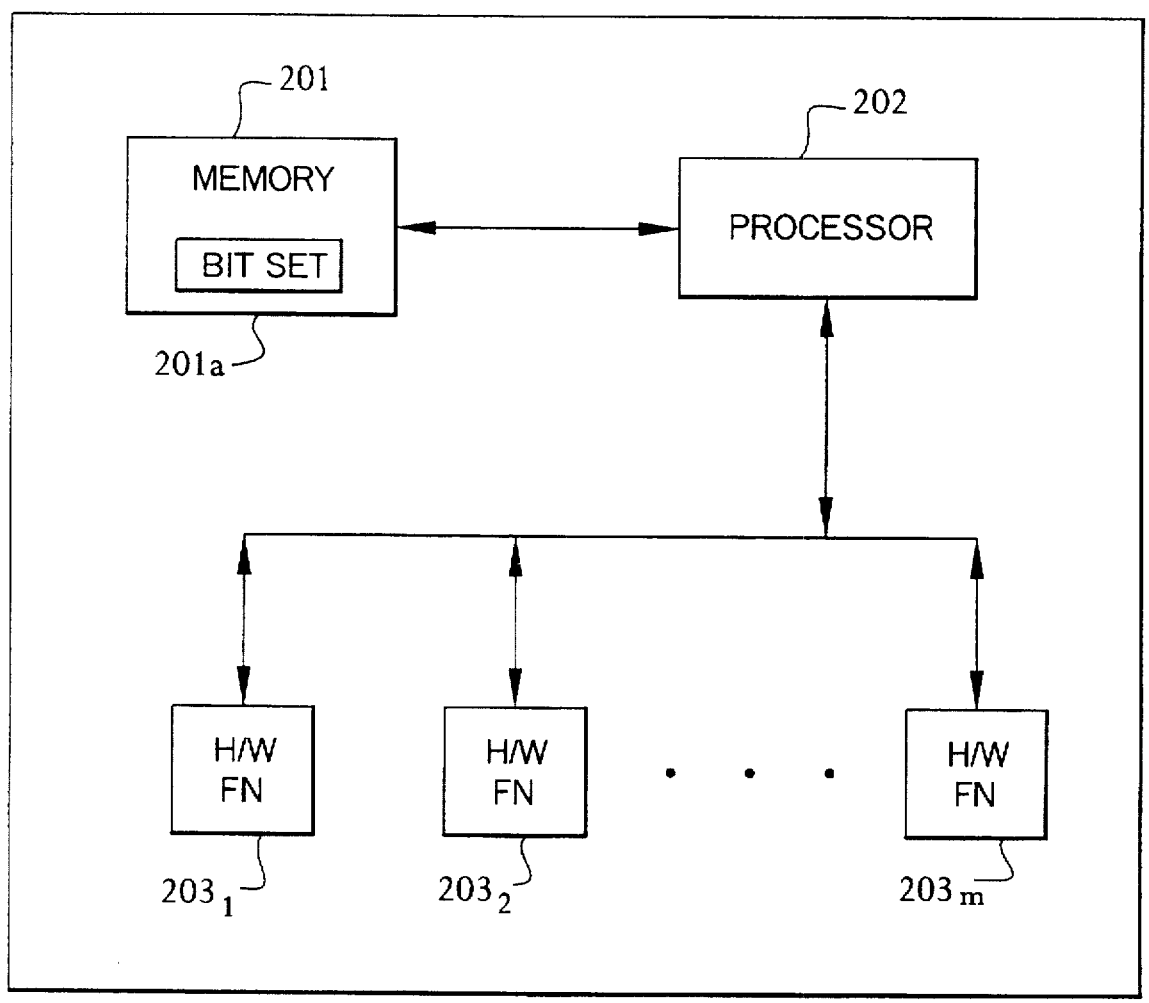
FIG. 2 is a more detailed representation of a terminal unit of the digital cable system of FIG. 1.

Referring now to FIG. 2, there is shown a more detailed representation of terminal unit $120_1$ of digital cable system 100 of FIG. 1. Terminal unit $120_1$ contains memory 201, processor 202, and M initially disabled hardware components or functions $203_1-203_M$. Memory 201 stores a bit set $201_a$ that represents which hardware functions $203_1-203_M$ are enabled for usage by the user and by terminal unit $120_1$. Each hardware function $203_i$ may thus be uniquely enabled or disabled depending upon the contents of bit set $201_a$. Memory 201 is any memory device suitable for storing digital signals, and is preferably a non-volatile memory such as Flash RAM. Processor 202 is preferably a general purpose processor such as an Intel® i486™ class microprocessor, and may contain several co-processors or sub-processors such as a second i486™ processor or a floating point processor (in the case of an Intel® i386™-type main processor).

Hardware functions $203_1-203_M$ are functions performed by individual hardware components within terminal unit $120_1$. Thus, a hardware function $203_i$ may represent the function performed by a dedicated hardware component or module within terminal unit $120_1$. In this case the hardware function represents the entire hardware module that performs the function as well as the function itself. For example, hardware function $203_1$ may represent dedicated pixel processing hardware that can be utilized to speed up the rendering of 3D texture mapped polygons. If processor 202 is an Intel® i386™ processor, for example, hardware function $203_2$ may represent a separate i387™ math co-processor useful in speeding up calculations of 3D polygon coordinates; and hardware function $203_3$ may represent a second Pentium™ processor that may be used in tandem with a first Pentium™ processor for performing parallel processing. Hardware function $203_4$ may be one or more RAM chips useful for enhancing the performance of certain applications performed by terminal unit $120_1$.

Alternatively, rather than an entire component and its function(s), a hardware function $203_i$ may represent one or more of several functions that a more general purpose hardware component is capable of performing. For example, processor 202, besides a basic or normal set of processing features, may contain the ability to perform 3D graphics rendering. This function, performed by processor 202 in addition to other functions, may be represented by, for example, hardware function $203_5$.

It will be appreciated that a hardware function $203_i$ represents general processing or other functions performable by a hardware component mounted within a terminal unit $120_1$. It will be understood that such functions may include processing operations including the execution of the instructions of a computer program stored, for example, in memory within the hardware component performing the hardware function. Such a program may be stored in RAM or ROM within the hardware component. Thus, for example, hardware function $203_6$ may be the function of a hardware component capable of running a programming guide more advanced than a basic programming guide that is basic enough so that it can run on processor 202 without the use of any of the hardware functions $203_1$–$203_M$. The machine-level instructions executed by hardware function $203_6$ may be stored, for example, in RAM or ROM within the corresponding hardware component. It will be appreciated that, where such a program is stored in RAM or ROM for use by a hardware function $203_i$, the program may be downloaded into memory subsequent to the user acquiring terminal unit $120_1$, as further discussed below.

It will be appreciated that a given hardware function $203_i$ may be performed jointly by several discrete modules, such as RAM and a processor, of terminal unit $120_1$, in which case all of such hardware components or modules taken together are considered to be a "hardware component" that performs hardware function $203_i$.

It will be appreciated that memory 201 may contain bit set $201_a$ which is representative of the tier of services available over digital cable system 100 that the user has selected or purchased. Bit set $201_a$ within memory 201 determines, by contrast, not which cable-delivered services are available to the user, but which hardware functions within terminal unit $120_1$ have been selected for a hardware tier of services by the user. In alternate preferred embodiments, bit set $201_a$ may contain information that determines, for example, which hardware functions are enabled for particular cable-delivered services, as discussed in more detail below.

Typically, a customer or user will subscribe to digital cable services offered over digital cable system 100. Terminal unit $120_1$ will initially be installed, for example, mounted to the user's PC or television, with hardware functions $203_1$–$203_M$ initially disabled. A user may initially select a basic tier of hardware services in which each hardware function $203_i$ is dormant and remains disabled. If a user later decides to upgrade to one of the internally-built-in hardware functions $203_1$–$203_M$, the user can transmit this request to the cable system operator or, for example, directly to head end control unit 101 via I/O device 121. After the user requests this enhanced tier of hardware functions, head end control unit 101 broadcasts a new bit set $201_a$ over cable 110 to terminal unit $120_1$, which instructs processor 202 to enable the selected hardware functions, each hardware function being uniquely enableable or disableable. In this manner, a user not sure or unwilling to purchase all the available hardware function options available within terminal units may initially receive a terminal unit with these options disabled, yet still retain the ability to quickly and conveniently purchase the use of additional hardware functions without the necessity of having a new hardware component or terminal unit physically installed. The cable system operator may also realize efficiencies utilizing this invention since fewer hardware configurations may need to be offered to cable subscribers, thus allowing economies of scale in design, manufacture, distribution, and service.

It will be appreciated that, although a preferred embodiment is described herein with respect to a terminal unit $120_1$ initially containing hardware functions $203_1$–$203_M$, in alternative preferred embodiments any or all of a plurality of hardware functions may be physically installed in the terminal unit subsequently.

Similarly, it will be understood by those skilled in the art that a software program executed by a given hardware function $203_i$ and that is stored in memory associated with the corresponding hardware component, may itself be loaded into the component for a fee via cable 110. The following example illustrates this usage of the present invention. Terminal unit $120_1$ may contain a basic-level program stored in ROM that processor 202 can use to run a basic-level programming guide, which may be used by the user to select, program, and control available services offered over digital cable system 100. Terminal unit $120_1$ may also initially contain a second, more advanced program for use as a programming guide, stored within the same or within a different ROM, that processor 202 can also run. The advanced program stored in ROM and running on processor 202 can constitute an initially disabled hardware function $203_i$ that the user may choose to upgrade to later. However, in the current invention another program may be developed subsequently that is not initially stored in memory in terminal unit $120_1$; or, alternatively, the advanced programming guide may not initially be stored in terminal unit $120_1$. The user of terminal unit $120_1$ may select a channel that offers for sale various software programs such as word processing applications or video games. Such a service on one of the digital channels may also offer for sale to a user various upgrades of hardware components within terminal unit $120_1$, such as the aforementioned advanced programming guide. For a fee, the user may purchase a one-time download of the program. After head end control unit 101 downloads the program to terminal unit $120_1$, the program may be stored in a Flash RAM or other non-volatile memory within terminal unit $120_1$. At this point, the program stored in memory and that can be run by processor 202 can constitute a hardware function $203_i$ that may be enabled or disabled selectively by bit set $201_a$ depending upon the tier of hardware functions selected by the user. Thus, for example, a user may pay an initial fee for the upgrading of a hardware module, which may include an initial amount of use. The user may subsequently decide to drop this hardware function, but the hardware module may still retain the upgraded program so that the new hardware function may subsequently be purchased or selected by the user without needing to have the upgrade program downloaded to terminal unit $120_1$.

It will further be appreciated by those skilled in the art that various optional hardware functions $203_1$–$120_M$ may be enabled indirectly by the user's choice of various services offered on one of the digital channels of digital cable system 100. For example, while accessing a video game channel, the user may purchase, for a given time period, an advanced video game which may require one or more of hardware functions $203_1$–$203_M$ in its operation. Thus, the video game will automatically manipulate bit set $201_a$ to allow the video game to utilize one or more of hardware functions $203_1$–$203_M$ while it is operating. Alternatively, terminal unit $120_1$ can be configured to allow certain cable services to directly enable certain hardware functions. In this usage the price paid by the user for the video game includes a portion for the use of the cable service and a portion for the use of the hardware function. Alternatively, if a user ordered an advanced video game requiring, say, hardware function $203_1$, when operating the video game the video game might automatically manipulate bit set $201_a$ to allow the video game to utilize hardware functions $203_1$, unless hardware function $203_1$ is already enabled. When hardware function $203_1$ is enabled, this may be detected by processor 202 and a signal sent by terminal unit $120_1$ via a digital back channel to head end control unit 101 so that the user can be charged for temporarily enabling/using the hardware function.

As another example of the implementation and usage of the current invention, hardware function $203_1$ may represent, as described above, dedicated pixel processing hardware that can be utilized to speed up the rendering of 3D texture mapped polygons. While using a video games channel, if a user decides to select a certain video game, a notice may inform the user that the video game may be played only if the user has a terminal unit with an enabled dedicated pixel processor, and may give the user the option to enable hardware function $203_1$ for a given price. If the user purchases hardware function $203_1$ for a given time period, during this time period a wider range of video games may be available for use (perhaps for a separate charge related to the video games service channel) or, alternatively, many video games that may be played without using hardware function $203_1$ may operate at an enhanced performance level if hardware function $203_1$ is enabled within terminal unit $120_1$. For example, an enhanced performance level may include higher quality or faster changing graphics displays. In another usage, a given service such as a video games channel may enable a hardware function such as hardware function $203_1$ in a promotional or free demonstration of the enhanced performance level.

It will further be appreciated that, in alternative preferred embodiments, bit set $201_a$ may contain unique enabling information with respect to each hardware function to enable a given hardware function $203_i$ to be enabled only for use with certain cable services, or, alternatively, only for use at certain times or for a certain amount of usage time. For example, head end control unit 101 may broadcast a new bit set $201_a$ in response to a selection or request by a user to enable hardware function $203_1$ only for use with an advanced Sony video game service, but not for use with an advanced Sega video game service, each of which may be available as an optional service over a separate digital channel. In other usages, one cable service may enable a hardware function such as hardware function $203_1$, for free for the user's temporary usage, but only with that service provider's service. Alternatively, bit set $201_a$ may contain information that enables a given hardware function $203_i$ for a predetermined one-month period. As another example, bit set $201_a$ may contain information that enables a given hardware function $203_i$ for a predetermined length of time, for example for a ten-hour block of time. In this usage, as the user accesses services that require the use of the enabled hardware function $203_i$, the amount of time remaining is decreased accordingly within bit set $201_a$ until no time remains and the hardware function is no longer enabled.

It will further be appreciated that the configuration of and hardware functions available within terminal units $120_1$–$120_N$ may be different. For example, some of terminal units $120_1$–$120_N$ may be manufactured or delivered to users later than other terminal units, and thus may contain a different or larger set of hardware functions.

It will also be understood that in a preferred embodiment head end control unit 101 has the ability to poll each terminal unit selectively at any given time to determine which hardware functions are enabled and which are disabled, and to determine which hardware functions are available within the terminal unit.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A terminal unit for use within a digital cable system having a head end control unit, the terminal unit comprising:
   (a) processor means and at least one selectively enabled hardware function, wherein the at least one selectively enabled hardware function comprises a plurality of selectively enabled hardware functions, wherein each selectively enabled hardware function of the plurality of selectively enabled hardware functions can be uniquely enabled or disabled;
   (b) memory means for storing a bit set representative of the enabled or disabled status of each selectively enabled hardware function of the plurality of selectively enabled hardware functions;
   (c) means for setting the bit set to enable or disable each selectively enabled hardware function of the plurality of selectively enabled hardware functions in accordance with a control signal received by the terminal unit from the head end control unit; and
   (d) means for enabling or disabling each selectively enabled hardware function in accordance with the bit set.

2. The terminal unit of claim 1, wherein the head end control unit comprises means for transmitting the control signal to the terminal unit via a dedicated control channel of the digital cable system.

3. The terminal unit of claim 1, wherein the head end control unit comprises means for transmitting the control signal to the terminal unit via a control channel embedded in one or more digital data channels of the digital cable system, wherein specific header bits of the control channel identify one or more packets of data transmitted over the one or more digital channels as being control signals.

4. The terminal unit of claim 1, wherein the bit set represents the enabled or disabled status of each selectively enabled hardware function with respect to selected cable services of a plurality of cable services offered on the digital cable system.

5. The terminal unit of claim 1, wherein the memory means comprises a flash random access memory.

6. The terminal unit of claim 1, wherein the terminal unit is connected to the cable and the cable is connected to the head end control unit.

7. The terminal unit of claim 1, wherein the control signal is broadcast to the terminal unit by the head end control unit via the cable.

8. The terminal unit of claim 1, wherein the control signal is generated by the head end control unit in response to a request generated by an optional cable service offered on the digital cable system.

9. The terminal unit of claim 1, wherein the control signal is generated by the head end control unit in response to a request from a user of the terminal unit.

10. The terminal unit of claim 9, wherein the control signal is broadcast to the terminal unit by the head end control unit via the cable.

11. The terminal unit of claim 1, wherein a user of the terminal unit may select an optional cable service offered on the digital cable system, the terminal unit further comprising means for setting the bit set to enable or disable each selectively enabled hardware function in accordance with a second control signal generated by the optional cable service.

12. The terminal unit of claim 1, wherein the optional hardware function is initially disabled when a user of the terminal unit acquires the terminal unit.

13. The terminal unit of claim 1, wherein the optional hardware function is installed in the terminal unit after a user of the terminal unit acquires the terminal unit.

14. The terminal unit of claim 13, wherein the optional hardware function is initially disabled when the optional hardware function is installed in the terminal unit.

15. The terminal unit of claim 1, wherein the terminal unit is one of a plurality of terminal units for use within the digital cable system.

16. A method for upgrading hardware functions, comprising the steps of:

(a) providing a terminal unit for use within a digital cable system having a head end control unit, the terminal unit comprising:

(1) processor means and at least one selectively enabled hardware function, wherein the at least one selectively enabled hardware function comprises a plurality of selectively enabled hardware functions wherein each selectively enabled hardware function of the plurality of selectively enabled hardware functions can be uniquely enabled or disabled;

(2) memory means for storing a bit set representative of the enabled or disabled status of each selectively enabled hardware function of the plurality of selectively enabled hardware functions;

(3) means for setting the bit set to enable or disable each selectively enabled hardware function of the plurality of selectively enabled hardware functions in accordance with a control signal received by the terminal unit from the head end control unit; and (4) means for enabling or disabling each selectively enabled hardware function in accordance with the bit set;

(b) connecting the terminal unit and the head end control unit to the cable; and (c) broadcasting the control signal with the head end control unit via the cable to the terminal unit.

17. The method of claim 16, wherein the memory means comprises a flash random access memory.

18. The method of claim 16, further comprising the step of:

(d) receiving a request from a user of the terminal unit; wherein the control signal is generated by the head end control unit in response to the request.

19. The method of claim 16, further comprising the steps of:

(d) receiving a request by a user of the terminal unit for an optional cable service offered on the digital cable system;

(e) generating a second control signal to enable selected hardware functions of the plurality of selectively enabled hardware functions in accordance with the request; and (e) setting the bit set to enable or disable the selected hardware functions in accordance with the second control signal.

20. The method of claim 16, further comprising the step of:

(d) providing a plurality of terminal units for use within the digital cable system, wherein the plurality of terminal units comprises the terminal unit.

21. A terminal unit for use within a digital cable system having a head end control unit, the terminal unit comprising:

(a) a processor;

(b) at least one selectively enabled hardware component, wherein the at least one selectively enabled hardware component comprises a plurality of selectively enabled hardware components, wherein each selectively enabled hardware component of the plurality of selectively enabled hardware components can be uniquely enabled or disabled; and (c) a memory that stores a bit set representative of whether each hardware component of the plurality of selectively enabled hardware components is enabled or disabled or disabled; wherein:

the processor sets the bit set is to enable or disable each hardware component in accordance with a control signal received from the head end control unit; and the processor enables or disables each hardware function in accordance with the bit set.

22. The terminal unit of claim 21, wherein the bit set represents the enabled or disabled status of each hardware component with respect to selected cable services of a plurality of cable services offered on the digital cable system.

23. The terminal unit of claim 21, wherein the control signal is generated by the head end control unit in response to a request generated by an optional cable service offered on the digital cable system.

24. The terminal unit of claim 21, wherein the control signal is generated by the head end control unit in response to a request from a user of the terminal unit.

25. The terminal unit of claim 21, wherein each hardware component is initially disabled when a user of the terminal unit acquires the terminal unit.

26. A terminal unit for use within a digital cable system having a head end control unit, the terminal unit comprising:

(a) processor means and at least one selectively enabled hardware function of a plurality of selectively enabled hardware functions, the plurality of selectively enabled hardware functions comprising a dedicated pixel processor, a math co-processor, a second general processor, a RAM chip, and a 3D graphics rendering processor;

(b) memory means for storing a bit set representative of the enabled or disabled status of each selectively enabled hardware function;

(c) means for setting the bit set to enable or disable each selectively enabled hardware function in accordance with a control signal received by the terminal unit from the head end control unit; and (d) means for enabling or disabling each selectively enabled hardware function in accordance with the bit set;

wherein a user of the terminal unit may select an optional cable service offered on the digital cable system, the terminal unit further comprising means for setting the bit set to enable or disable each selectively enabled hardware function in accordance with a second control signal generated by the optional cable service.

27. A method for upgrading hardware functions, comprising the steps of:

(a) providing a terminal unit for use within a digital cable system having a head end control unit, the terminal unit comprising:

(1) processor means and at least one selectively enabled hardware function of a plurality of selectively enabled hardware functions, the plurality of selectively enabled hardware functions comprising a dedicated pixel processor, a math co-processor, a second general processor, a RAM chip, and a 3D graphics rendering processor;

(2) memory means for storing a bit set representative of the enabled or disabled status of each selectively enabled hardware function;

(3) means for setting the bit set to enable or disable each selectively enabled hardware function in accordance with a control signal received by the terminal unit from the head end control unit; and (4) means for enabling or disabling each selectively enabled hardware function in accordance with the bit set;

(b) connecting the terminal unit and the head end control unit to the cable; and (c) broadcasting the control signal with the head end control unit via the cable to the terminal unit;

wherein a user of the terminal unit may select an optical cable service offered on the digital cable system, the terminal unit further comprising means for setting the bit set to enable or disable each selectively enabled hardware function in accordance with a second control signal generated by the optical cable service.

* * * * *